United States Patent Office 2,708,678
Patented May 17, 1955

2,708,678

IODINATED ACYL DERIVATIVES OF 2,4,6-TRIIODOMETA-AMINOBENZOIC ACID

Domenick Papa, Bloomfield, N. J., assignor to Schering Corporation, Bloomfield, N. J., a corporation of New Jersey No Drawing. Application January 15, 1954,
Serial No. 404,382

6 Claims. (Cl. 260—518)

This invention relates to new compounds which have X-ray contrast properties. More particularly the compounds of this invention, in the form of aqueous solutions of their non-toxic salts are contrast agents for the kidneys.

The compounds of this invention include the non-toxic alkali and alkaline earth metal salts as well as the non-toxic amine salts of the acids which have the formula:

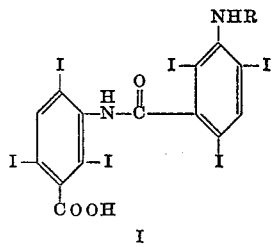

wherein R is a member of the group comprising hydrogen and lower acyl groups. The compounds of general Formula I, with the prferred specie being that wherein R is acetyl, are preferably utilized in the form of aqueous solutions of their non-toxic salts for intravenous administration. Following intravenous administration of such solutions, the calices and pelves of the kidneys become visible before the ureters and urinary bladder are visualized by means of X-ray.

The free acids of this invention are prepared, for example, by reacting the acid chloride of N-acetyl-2,4,6-triiodo-m-aminobenzoic acid with 2,4,6-triiodo-m-aminobenzoic acid in benzene solution, preferably in the presence of a base such as pyridine or triethylamine. Other inert solvents such as toluene, xylene, cymene, high-boiling ethers and the like, may be used in place of benzene. The requisite starting iodinated m-aminobenzoic acid and its acetylated derivative may be prepared by known methods. Other acyl derivatives of iodinated m-aminobenzoic acid such as the N-propionyl or N-butyryl may be employed giving rise to the corresponding acylated compound of general Formula I.

Alternatively, 2,4,6-triiodo-m-aminobenzoic acid may be reacted with its acid chloride as above described yielding the compound of general Formula I wherein R is hydrogen.

In order to prevent the formation of polymers by the successive reactions of the acid chloride with the unprotected amino group I prefer to react the acid chloride of 2,4,6-triiodo-m-aminobenzoic acid hydrochloride with 2,4,6-triiodo-m-aminobenzoic acid in dilute solution. The compound so obtained may be transformed into an acylamino derivative by reaction in a known manner with a suitable acylating agent such as acetic or propionic anhydride in pyridine.

EXAMPLE I

N-[3'-acetylamino-2',4',6'-triiodobenzoyl]-2,4,6-triiodo-m-aminobenzoic acid

The requisite intermediate, N-acetyl-2,4,6-triiodo-m-aminobenzoic acid chloride is prepared from the corresponding acid and an excess of thionyl chloride in benzene solution. After refluxing for several hours the excess thionyl chloride is removed by distillation in vacuo and the residue is taken up in benzene.

To a solution of 0.1 mole of 2,4,6-triiodo-m-aminobenzoic acid, 0.1 mole of pyridine in 250 ml. of anhydrous benzene is slowly added a solution of 0.1 mole of the above-prepared described acid chloride. The mixture is refluxed and stirred for several hours and, after cooling, is poured into a cold, dilute solution of sodium hydroxide. The layers are separated and the aqueous phase extracted thoroughly with benzene. The alkaline solution is acidified with dilute hydrochloric acid, whereupon the free acid of this invention precipitates. The precipitate is removed by filtration and recrystallized from aqueous alcohol yielding N-[3'-acetylamino-2',4',6'-triiodobenzoyl] - 2,4,6-triiodo-m-aminobenzoic acid.

EXAMPLE II

N-[3'-amino-2',4',6'-triiodobenzoyl]-2,4,6-triiodo-m-aminobenzoic acid

The requisite intermediate 2,4,6-triiodo-m-aminobenzoic acid chloride hydrochloride is prepared by treating a suspension of 2,4,6-triiodo-m-aminobenzoic acid hydrochloride in anhydrous benzene with thionyl chloride. After refluxing for several hours, the solvent is removed by distillation in vacuo and the residual acid chloride hydrochloride resuspended in anhydrous benzene.

To a stirred solution of 0.05 mole of 2,4,6-triiodo-m-aminobenzoic acid in 1.0 l. of anhydrous benzene is dropwise added a suspension of 2,4,6-triiodo-m-aminobenzoic acid chloride hydrochloride (prepared from 0.05 mole of the free acid hydrochloride) in 500 ml. of anhydrous benzene. The mixture is refluxed overnight, and is then poured into dilute sodium hydroxide solution. The layers are separated and the alkaline aqueous phase is acidified with acetic acid. The precipitated solids are removed by filtration and upon recrystallization from aqueous alcohol the acid of this example is obtained.

The acid of this example is transformed into the compound of Example I in the following manner: a mixture of 100 g. of N-[3'-amino-2',4',6'-triiodobenzoyl]-2,4,6-triiodo-m-aminobenzoic acid, 500 ml. of acetic anhydride and 2 ml. of perchloric acid is heated on a steam bath for four hours. The reaction mixture is poured into ice and again warmed on a steam bath and the resulting solvent is cooled by filtration and washed well with water. The solvent mixture is dissolved in dilute sodium hydroxide, the solution is filtered and the filtrate is acidified by the dropwise addition of dilute hydrochloric acid. When the neutral point is reached, 15 g. of sodium bisulfite are added and the resulting precipitate is removed by filtration, dried and recrystallized from aqueous alcohol yielding the compound of Example I.

EXAMPLE III

N-[3'-propionylamido-2',4',6'-triiodobenzoyl]-2,4,6-triiodo-m-aminobenzoic acid

This compound is prepared by substituting propionic anhydride in the procedure described in Example II. Purification is effected by recrystallization from acetic acid.

In a similar manner by employing butyric anhydride the corresponding N-[3'-butyrylamido - 2',4',6' - triiodobenzoyl]-2,4,6-triiodo-m-aminobenzoic acid is prepared.

EXAMPLE IV

N-[3'-formamido-2',4',6'-triiodobenzoyl]-2,4,6-triiodo-m-aminobenzoic acid

A mixture of 0.1 mole of the free amino acid of Example II and 305 ml. of 99.5% formic acid is heated to 60° and then 260 ml. of acetic anhydride is slowly added while maintaining the temperature between 60 and 70°. The reaction mixture is poured into one kg. of ice and after the ice has melted the solid is removed by filtration and dried. Purification is effected by recrystallization from alcohol.

EXAMPLE V

*Sodium salt of N-[3'-acetylamino-2',4',6'-triiodobenzoyl]-2,4,6-triiodo-m-aminobenzoic acid*

A solution of 25 g. of the acid of Example I is dissolved in 300 ml. of warm methanol and after cooling to room temperature a solution of 2 N sodium hydroxide is added through a burette, the neutralization being followed by a pH meter. At the neutral point the solution is concentrated to dryness in vacuo. The residual syrup is triturated with acetone and ether and the resulting crystalline material is washed with ether and dried at 70° yielding a sodium salt of this example.

I claim:

1. As an X-ray contrast agent, compounds selected from the group consisting of an acid of the formula:

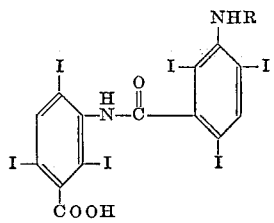

wherein R is a member of the group consisting of hydrogen and lower aliphatic carboxylic acyl radicals and the sodium salts thereof.

2. N-[3'-acetylamino-2',4',6'-triiodobenzoyl] - 2,4,6-triiodo-m-aminobenzoic acid.

3. N-[3'-amino-2',4',6'-triiodobenzoyl]-2,4,6-triiodo-m-aminobenzoic acid.

4. N-[3'-formamido-2',4',6' - triiodobenzoyl]-2,4,6-triiodo-m-aminobenzoic acid.

5. N-[3'-propionylamido-2',4',6'-triiodobenzoyl]-2,4,6-triiodo-m-aminobenzoic acid.

6. The sodium salt of N-[3'-acetylamino-2',4',6'-triiodobenzoyl]-2,4,6-triiodo-m-aminobenzoic acid.

References Cited in the file of this patent
UNITED STATES PATENTS
2,611,786    Wallingford _____ Sept. 23, 1952
OTHER REFERENCES
Neuhaus et al., Chem. Ab., vol. 46, col. 1714 (1952).